(12) United States Patent
Arnott et al.

(10) Patent No.: US 10,833,726 B2
(45) Date of Patent: *Nov. 10, 2020

(54) FREQUENCY HOPPING

(71) Applicant: NEC CORPORATION, Tokyo (JP)

(72) Inventors: Robert Arnott, London (GB); Yassin Aden Awad, London (GB)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/881,755

(22) Filed: May 22, 2020

(65) Prior Publication Data

US 2020/0287588 A1    Sep. 10, 2020

Related U.S. Application Data

(63) Continuation of application No. 16/795,069, filed on Feb. 19, 2020, which is a continuation of application (Continued)

(30) Foreign Application Priority Data

Feb. 5, 2007 (GB) .................................. 0702190.0

(51) Int. Cl.
*H04L 5/00* (2006.01)
*H04B 1/7143* (2011.01)
(Continued)

(52) U.S. Cl.
CPC ......... *H04B 1/7143* (2013.01); *H04B 7/2621* (2013.01); *H04L 5/0005* (2013.01);
(Continued)

(58) Field of Classification Search
CPC ................ H04B 1/7143; H04B 7/2621; H04B 2201/71323; H04L 5/0039; H04L 5/0005; H04W 72/0446; H04W 72/0453
See application file for complete search history.

(56) References Cited

U.S. PATENT DOCUMENTS

| | | | |
|---|---|---|---|
| 4,355,399 A | 10/1982 | Timor | |
| 6,138,019 A | 10/2000 | Trompower et al. | |

(Continued)

FOREIGN PATENT DOCUMENTS

| | | |
|---|---|---|
| CN | 1723647 A | 1/2006 |
| CN | 1774870 A | 5/2006 |

(Continued)

OTHER PUBLICATIONS

Communication dated Dec. 15, 2015, issued by the European Patent Office in corresponding European Application No. 15183052.8.

(Continued)

*Primary Examiner* — Dac V Ha

(74) *Attorney, Agent, or Firm* — Sughrue Mion, PLLC

(57) ABSTRACT

A communications node operable to communicate with another communications node over a communications channel having a plurality of frequency resources, the communications node includes data defining a division of the communications channel into a plurality of contiguous sub-bands each having N frequency resources, wherein each frequency resource in a sub-band has a corresponding frequency resource in each of the other sub-bands, data defining an initial allocation of the frequency resources, a resource determination module operable to apply a frequency shift to the initially allocated frequency resources in accordance with a frequency hopping sequence to determine frequency resources to use for communicating information with the other communications node, wherein the frequency shift applied moves the initially allocated frequency resources to corresponding frequency resources in another sub-band, a transceiver for communicating information with the other communications node using the determined frequency resource.

9 Claims, 6 Drawing Sheets

Related U.S. Application Data

No. 16/713,178, filed on Dec. 13, 2019, which is a continuation of application No. 16/292,186, filed on Mar. 4, 2019, now Pat. No. 10,554,250, which is a continuation of application No. 16/035,820, filed on Jul. 16, 2018, now Pat. No. 10,530,419, which is a continuation of application No. 15/408,552, filed on Jan. 18, 2017, now Pat. No. 10,027,373, which is a continuation of application No. 14/614,558, filed on Feb. 5, 2015, now Pat. No. 9,584,269, which is a continuation of application No. 14/044,821, filed on Oct. 2, 2013, now Pat. No. 8,982,925, which is a continuation of application No. 13/414,379, filed on Mar. 7, 2012, now Pat. No. 8,774,250, which is a continuation of application No. 12/521,298, filed as application No. PCT/JP2008/051895 on Jan. 30, 2008, now Pat. No. 8,170,080.

(51) Int. Cl.
  *H04B 7/26* (2006.01)
  *H04W 72/04* (2009.01)

(52) U.S. Cl.
  CPC ........ *H04L 5/0039* (2013.01); *H04W 72/0446* (2013.01); *H04W 72/0453* (2013.01); *H04B 2201/71323* (2013.01)

(56) References Cited

U.S. PATENT DOCUMENTS

| | | | |
|---|---|---|---|
| 6,795,688 | B1 | 9/2004 | Plasson et al. |
| 7,154,933 | B2 | 12/2006 | Agrawal |
| 7,376,117 | B2 | 5/2008 | Erlich et al. |
| 7,542,504 | B2 | 6/2009 | Chang et al. |
| 7,860,150 | B2 | 12/2010 | Tiirola et al. |
| 8,184,672 | B2 | 5/2012 | Arnott et al. |
| 8,259,658 | B2 | 9/2012 | Nishio et al. |
| 8,483,257 | B2 | 7/2013 | Ann et al. |
| 8,711,783 | B2 | 4/2014 | Pi |
| 8,891,587 | B2 | 11/2014 | Arnott et al. |
| 8,971,377 | B2 | 3/2015 | Arnott et al. |
| 9,391,805 | B2 | 7/2016 | Wang et al. |
| 2004/0161018 | A1 | 8/2004 | Maric |
| 2005/0152327 | A1 | 7/2005 | Erlich et al. |
| 2005/0163194 | A1 | 7/2005 | Gore et al. |
| 2006/0072649 | A1 | 4/2006 | Chang et al. |
| 2006/0135075 | A1 | 6/2006 | Tee et al. |
| 2006/0146760 | A1 | 7/2006 | Khandekar |
| 2006/0172716 | A1 | 8/2006 | Yoshii et al. |
| 2007/0014272 | A1 | 1/2007 | Palanki et al. |
| 2007/0201398 | A1 | 8/2007 | Yang et al. |
| 2008/0013599 | A1 | 1/2008 | Malladi |
| 2008/0165743 | A1 | 7/2008 | Palanki et al. |
| 2008/0225791 | A1 | 9/2008 | Pi et al. |
| 2008/0291975 | A1 | 11/2008 | Sorgel et al. |
| 2009/0109906 | A1 | 4/2009 | Love et al. |
| 2009/0122752 | A1 | 5/2009 | Nishio et al. |
| 2009/0252112 | A1 | 10/2009 | Shimomura et al. |
| 2009/0316758 | A1 | 12/2009 | Ahn et al. |
| 2010/0111139 | A1 | 5/2010 | Arnott et al. |
| 2010/0284363 | A1 | 11/2010 | Ahn et al. |
| 2011/0065468 | A1 | 3/2011 | Parkvall et al. |
| 2011/0243191 | A1 | 10/2011 | Nakao et al. |
| 2011/0255518 | A9 | 10/2011 | Agrawal et al. |
| 2012/0250653 | A1* | 10/2012 | Zhang ............... H04W 72/1226 370/330 |
| 2012/0300660 | A1 | 11/2012 | Nishio et al. |
| 2013/0215823 | A1 | 8/2013 | Shin et al. |
| 2013/0279469 | A1 | 10/2013 | Van De Beek et al. |
| 2014/0086205 | A1 | 3/2014 | Nakasato |
| 2015/0092739 | A1 | 4/2015 | Kwak et al. |
| 2015/0358946 | A1 | 12/2015 | Wang et al. |
| 2016/0006546 | A1 | 1/2016 | Yi et al. |
| 2016/0205692 | A1 | 7/2016 | Zhang |
| 2016/0323011 | A1 | 11/2016 | Tang et al. |
| 2016/0381666 | A1 | 12/2016 | Kim et al. |
| 2017/0134068 | A1* | 5/2017 | Ahn ................... H04L 27/2602 |
| 2018/0027558 | A1 | 1/2018 | Vrzic et al. |
| 2018/0367185 | A1 | 12/2018 | Yi et al. |
| 2019/0150118 | A1 | 5/2019 | Nam et al. |

FOREIGN PATENT DOCUMENTS

| | | |
|---|---|---|
| CN | 1885752 A | 12/2006 |
| EP | 1909426 A2 | 4/2008 |
| GB | 2401512 A | 11/2004 |
| JP | 2000-151468 A | 5/2000 |
| JP | 2006-504324 A | 2/2006 |
| JP | 2006-352380 A | 12/2006 |
| WO | 2004/082182 A1 | 9/2004 |
| WO | 2006/012940 A1 | 2/2006 |
| WO | 2006/069401 A1 | 6/2006 |
| WO | 2006/134947 A1 | 12/2006 |
| WO | 2006/138206 A1 | 12/2006 |
| WO | 2007/052766 A1 | 5/2007 |

OTHER PUBLICATIONS

3GPP TSG RAN WG1 Meeting #46bis, R1-062498, Seoul, Korea, Oct. 9-13, 2006.
3GPP TSG RAN WG1 Meeting #47, R1-063085, Riga, Latvia, Nov. 6-10, 2006.
Samsung: "Discussuin on control signalling for persistent scheduling of VoIP", 3GPP TSG RAN WG1 #47, Online No. R1-063275, Riga, Latvia, Nov. 6-10, 2006.
Svensson, et al., "B-IFDMA—A Power Efficient Multiple Access Scheme for Non-frequency adaptive Transmission", XP 31132569, 2007.
Texas Instruments, "Summary of Reflector Discussions on EUTRA DL RS Design Issues", 3GPP TSG RAN WG1#46bis, 6.5, R1-062639, Seoul, Korea, 9-13, 2006 (3 pages total).
Texas Instruments, "Summary of Reflector Discussions on EUTRA DL RS", 3GPP TSG RAN WG1#47bis, 6.6.1, R1-070265, Sorrento, Italy, 15 Jan. 19, 2007 (2 pages total).
United States Non-Final Office Action dated Mar. 15, 2019 in U.S. Appl. No. 16/035,820.
United States Notice of Allowance dated Feb. 27, 2014, in U.S. Appl. No. 13/414,379.
United States Office Action dated Jan. 15, 2014, in U.S. Appl. No. 13/044,815.
United States Office Action dated Jul. 14, 2014 in U.S. Appl. No. 14/044,827.
United States Office Action dated Jul. 18, 2014 in U.S. Appl. No. 14/044,821.
ZTE Corporation: "Combination of Uplink Semi-persistent Schedule and Frequency Hopping", 3GPP TSG RAN WG1 #49BIS, Online No. R1-072907, Jun. 25, 2007 (Jun. 25, 2007), XP002482992 Orlando, USA.
ZTE Corporation: "RB Resource Frequency Hopping in E-UTRAN Uplink" 3GPP TSG RAN WG1 #48, Online No. R1-070680, Feb. 12, 2007 (Feb. 12, 2007),—Feb. 16, 2007 (Feb. 16, 2007) XP002482991 St. Louis, USA.
ZTE, "Multiple Continuous RB Allocation Frequency Hopping in E-UTRAN Uplink", 3GPP TSG-RAN WG1 #47bis, 6.2, R1-070203, Sorrento, Italy, Jan. 15-19, 2007 (7 pages total).
3GPP TSG RAN1 #46bis, R1-062707, Seoul, Korea, Oct. 9-13, 2006.
Chinese Office Action dated Apr. 2, 2014, with English translation.
Chinese Office Action dated Mar. 31, 2014, with English translation.
Communication dated Apr. 21, 2016 from the U.S. Patent and Trademark Office in counterpart U.S. Appl. No. 14/614,558.
Communication dated Dec. 15, 2016 from the Australian Intellectual Property Office in counterpart application No. 2015203120.
Ericsson: "Persistent Scheduling for E-UTRA" TSG-RAN WG1 LTE AdHoc, Online No. R1-060099, Helsinki, Finland, Jan. 23-25, 2006.

(56) References Cited

OTHER PUBLICATIONS

Ericsson: Frequency Hopping for E-UTRA Uplink, 3GPP TSG RAN WG1 #46BIS, Online No. R1-062851, Oct. 9, 2006 (Oct. 9, 2006,-Oct. 13, 2006 (Oct. 13, 2006) XP002482990 Seoul, Korea.
European Office Action dated Dec. 2, 2009.
European Search Report dated Mar. 26, 2014.
Frank, et al., "IFDMA: A Scheme Combining the Advantages of OFDMA and CDMA", IEEE Wireless Communications, Jun. 2007, pp. 9-17, XP 11189161.
Huawei, "Uplink Reference Signal for E-UTRA", 3GPP TSG RAN WG1 Meeting #46bis, Oct. 13, 2006, R1-062498.
Japanese Office Action dated May 29, 2013, with translation.
Japanese Office Action dated Nov. 2, 2011.
LG Electronics: Two Alternative Approaches for UL Frequency Hopping 3GPP TSG RAN WG1 #50, Online No. R1-073492, SP002482993, Aug. 22-24, 2007.
NEC Group, NTT DOCOMO: "Performance of D-FDMA and L-FDMA with Frequency Hopping for EUTRA Uplink", 3GPP TSG RAN WG1 #46bis, Online No. R1-062761, Oct. 9, 2006, Oct. 13, 2006 (Oct. 13, 2006) XP002482989 Seoul, Korea.
NEC Group, NTT DoCoMo: Uplink Resource Allocation for E-UTRA, TSG-RAn WG1 #47bis, Online No. R1-070364, Sorrento, Italy, Jan. 15-19, 2007.
NEC Group: "Frequency Hopping Pattern for EUTRA Uplink" 3GPP TSG RAN WG1 #51, Online No. R1-074723, Nov. 5, 2007 (Nov. 5, 2007), Nov. 9, 2007 (Nov. 9, 2007) XP002482994 Jeju, Korea.
NEC Group: "Frequency Hopping Pattern for EUTRA Uplink", TSG-RAN WG1 #48, Feb. 16, 2007, R1-070875.
NEC Group: "Performance of CAZAC pilot sequence for D-FDMA and L-FDMA with Frequency Hopping for EUTRA Uplink" TSG-RAN WG1 #44 No. R1-060604, Denver, USA, Feb. 13-17, 2006.
Nokia, "Downlink signaling for UTRA LTE", 3GPP TSG-RAN WG1 Meeting #44bis, 10.1.1, R1-060803, Athens, Greece, Mar. 27 31, 2006 (4 pages total).
NTT DoCoMo, "Text proposals on LTE Physical Layer Description for TR 25.912, Chapter 7", 3GPP TSG RAN WG1 Meeting #45, 11.8, R1-061646, Shanghai, China, May 8 12, 2006 (12 pages total).
NTT DoCoMo, NEC "Persistent Scheduling in E-UTRA", 3GPP TSG RAN WG1 #47, Online No. R1-063319, Riga, Latvia, Nov. 6-10, 2006 (original R1-062286).
Qualcomm Europe, "Issues for FDD/TDD aligned Numerology", 3GPP TSG RAN1 #46bis, Oct. 13, 2006, R1-062687.
LG Electronics, "Uplink frequency hopping", 3GPP TSG RAN WG1 #47bis, Sorrento, Italy, Jan. 15-19, 2007 , R1-070224, 5 pages total.

\* cited by examiner

FREQUENCY HOPPING

CROSS-REFERENCE OF RELATED APPLICATIONS

This application is a Continuation of U.S. application Ser. No. 16/795,069, filed Feb. 19, 2020, which is a Continuation of U.S. application Ser. No. 16/713,178, filed Dec. 13, 2019, which is a Continuation of U.S. application Ser. No. 16/292,186 filed Mar. 4, 2019, issued as U.S. Pat. No. 10,554,250 on Feb. 4, 2020, which is a Continuation of U.S. application Ser. No. 16/035,820 filed Jul. 16, 2018, issued as U.S. Pat. No. 10,530,419 on Jan. 7, 2020, which is a Continuation of U.S. application Ser. No. 15/408,552 filed Jan. 18, 2017, issued as U.S. Pat. No. 10,027,373 on Jul. 17, 2018, which is a Continuation of U.S. application Ser. No. 14/614,558 filed Feb. 5, 2015, issued as U.S. Pat. No. 9,584,269 on Feb. 28, 2017, which is a Continuation of U.S. application Ser. No. 14/044,821 filed Oct. 2, 2013, issued as U.S. Pat. No. 8,982,925 on Mar. 17, 2015, which is a Continuation of U.S. application Ser. No. 13/414,379 filed Mar. 7, 2012, issued as U.S. Pat. No. 8,744,250 on Jul. 8, 2014, which is a Continuation of U.S. application Ser. No. 12/521,298 filed Jun. 25, 2009, issued as U.S. Pat. No. 8,170,080 on May 1, 2012, which is based on International Application PCT/JP2008/051895 filed Jan. 30, 2008, which is based on and claims priority from British Patent Application 0702190.0 filed Feb. 5, 2007, the entire contents of which are incorporated herein by reference.

TECHNICAL FIELD

The present invention relates to frequency hopping within a communication system. The invention has particular, although not exclusive relevance to the efficient signalling of frequency hopping information between devices of a communication system that uses Frequency Division Multiple Access (FDMA) techniques.

This application is based upon and claims the benefit of priority from United Kingdom Patent application No. 0702190.0, filed on Feb. 5, 2007, the disclosure of which is incorporated herein in its entirety by reference.

BACKGROUND ART

Localised FDMA with inter and intra Transmission Time Interval (TTI) Frequency Hopping (L-FDMA+FH) has been selected as the uplink multiple access scheme for the E-UTRA air interface currently been studied in 3GPP (which is a standard based collaboration looking at the future evolution of third generation mobile telecommunication systems). Under the E-UTRA system, a base station (eNodeB) which communicates with a number of user devices (UEs) allocates the total amount of time/frequency resource among as many simultaneous users as possible, in order to enable efficient and fast link adaptation and to attain maximum multi-user diversity gain.

DISCLOSURE OF INVENTION

In such communication systems, problems arise in determining how to perform the frequency hopping in the different user devices and how to signal a selected frequency hopping scheme to each user device so that they know which resources to use for their communications.

According to one aspect, the present invention provides a communications node operable to communicate with another communications node over a communications channel having a plurality of frequency resources, the communications node comprising: data defining a division of the communications channel into a plurality of contiguous sub-bands each having N frequency resources; data defining an initial allocation of said frequency resources; a resource determination module operable to apply a frequency shift to the initially allocated frequency resources in accordance with a frequency hopping sequence to determine frequency resources to use for communicating information with the other communications node and in accordance with the following equation: $y=\{x+a(t)N\}$ mod NRB where: NRB is the total number of frequency resources in the transmission band; N is the number of contiguous frequency resources in each sub-band; x is the initially allocated frequency resource; y is the frequency hopped resource; t is a time counter; $a(t)$ is the frequency hopping shift applied at time point t, and is an integer value from the set $\{0, 1, \ldots, S-1\}$; and S is the number of sub-bands; and a transceiver for communicating information with the other communications node using the determined frequency resource.

In one exemplary embodiment each frequency resource in a sub-band has a corresponding frequency resource in each of the other sub-bands and the resource determination module is operable to apply a frequency shift that moves the initially allocated sub-band. This is preferred as it allows the communications node to be able to transmit information more efficiently than would be the case if the shifted resources are not contiguous and lie in different sub-bands.

In one exemplary embodiment, the resource determination module applies a frequency shift to its initially allocated frequency resource in accordance with a pseudo-random frequency hopping sequence, which may be calculated in advance or dynamically calculated at the time that the shift is to be applied using a predefined equation. Such an equation preferably uses a pseudo-random value so that the frequency hopping sequence obtained appears random.

In one exemplary embodiment, when the above communications node is a base station that communicates with a number of other communications nodes, it maintains data defining an initial allocation of said frequency resources for each of said other communications nodes; and the resource determination module applies a common frequency shift to the initially allocated frequency resource for each other communications node to determine a respective frequency resource to use for communicating information with each other communications node.

This aspect of the present invention may also provide a communications system comprising: a communications node and a plurality of user devices operable to communicate with the communications node over a communications channel; wherein the communications channel includes a transmission bandwidth, having a plurality of frequency resources, that is divided into a plurality of contiguous sub-bands each having N frequency resources; wherein each user device has a respective initial allocation of said frequency resources to use for communications with said communications node; and wherein each user device is operable to apply a frequency shift to its initially allocated frequency resource in accordance with a frequency hopping sequence, the frequency shift corresponding to an integer number of said sub-bands.

According to another, different, aspect, a communications system includes a communications node and a plurality of user devices operable to communicate with the communications node over a communications channel; wherein the communications channel includes a transmission bandwidth, having a plurality of frequency resources, that is divided into a plurality of contiguous sub-bands each having N frequency resources; wherein each user device has a respective initial allocation of said frequency resources to use for communications with said communications node; and wherein each user device is operable to apply a frequency shift to its initially allocated frequency resources in accordance with a frequency hopping sequence to determine frequency resources to use for communicating information with the communications node, and to apply a frequency shift that moves the initially allocated frequency resources to corresponding frequency resources in another sub-band.

In one exemplary embodiment, the at least one user is a persistently scheduled user and wherein one or more of the other user devices are dynamically scheduled users. Where several persistently scheduled user devices are provided with different communications intervals, the period of the frequency hopping sequence is set to be greater than the longest communications interval.

The frequency hopping sequence used by the user devices preferably has a period that is greater than five times and more preferably greater than ten times the periodicity of the periodic communications opportunity provided to said at least one user device. Where the communications channel is divided into a plurality of contiguous sub-bands, the frequency hopping sequence used by the user devices may have a period that is greater than the periodicity of the periodic communications opportunity provided to said at least one user device times the number of said sub-bands.

In one exemplary embodiment each user device applies a frequency shift to its initially allocated frequency resource in accordance with a pseudo-random frequency hopping sequence, which may be fixed in advance or dynamically calculated using a predetermined equation. Preferably the user devices dynamically calculate the frequency shift to be applied at a given time point using an equation that involves a pseudo-random value, as this makes the frequency hopping sequence appear random. A shift register circuit may be used for generating, at each time point, said pseudo-random value. In one exemplary embodiment, the shift register circuit has M registers and can generate a sequence of pseudo random values up to 2M in length and wherein the user devices periodically reset the shift register in synchronism with the periodicity of the frequency hopping sequence. When resetting the shift register, the user device preferably controls the frequency hopping sequence to be used by setting an initial state of the shift register each time it is reset to one of a predetermined number of possible initialisation states. This allows the same shift register circuit to be able to generate a number of different hopping sequences. In such an exemplary embodiment, the base station may signal which initialisation state is to be used by each user device at any given time.

According to a still further aspect, a method performed in a communications node which communicates with another communications node over a communications channel having a plurality of frequency resources, the method comprising:

defining a division of the communications channel into a plurality of contiguous sub-bands each having N frequency resources, wherein each frequency resource in a sub-band has a corresponding frequency resource in each of the other sub-bands; defining an initial allocation of said frequency resources; applying a frequency shift to the initially allocated frequency resources in accordance with a frequency hopping sequence to determine frequency resources to use for communicating information with the other communications node, wherein the frequency shift applied moves the initially allocated frequency resources to corresponding frequency resources in another sub-band; and communicating information with the other communications node using the determined frequency resource.

As those skilled in the art will appreciate, the invention relates to a number of different components of a system that can be made and sold separately. The invention also extends to these components alone as well as to the system as a whole.

As those skilled in the art will appreciate, the above aspects can be implemented separately or in any combination in a communications system. A specific exemplary embodiment will be described below which applies all the above aspects in a communications system.

BRIEF DESCRIPTION OF THE DRAWINGS

These and various other aspects of the invention will become apparent, from the following detailed description of an exemplary embodiment which is given by way of example only and which is described with reference to the accompanying Figures in which.

BEST MODE FOR CARRYING OUT THE INVENTION

Overview

Figure 1:
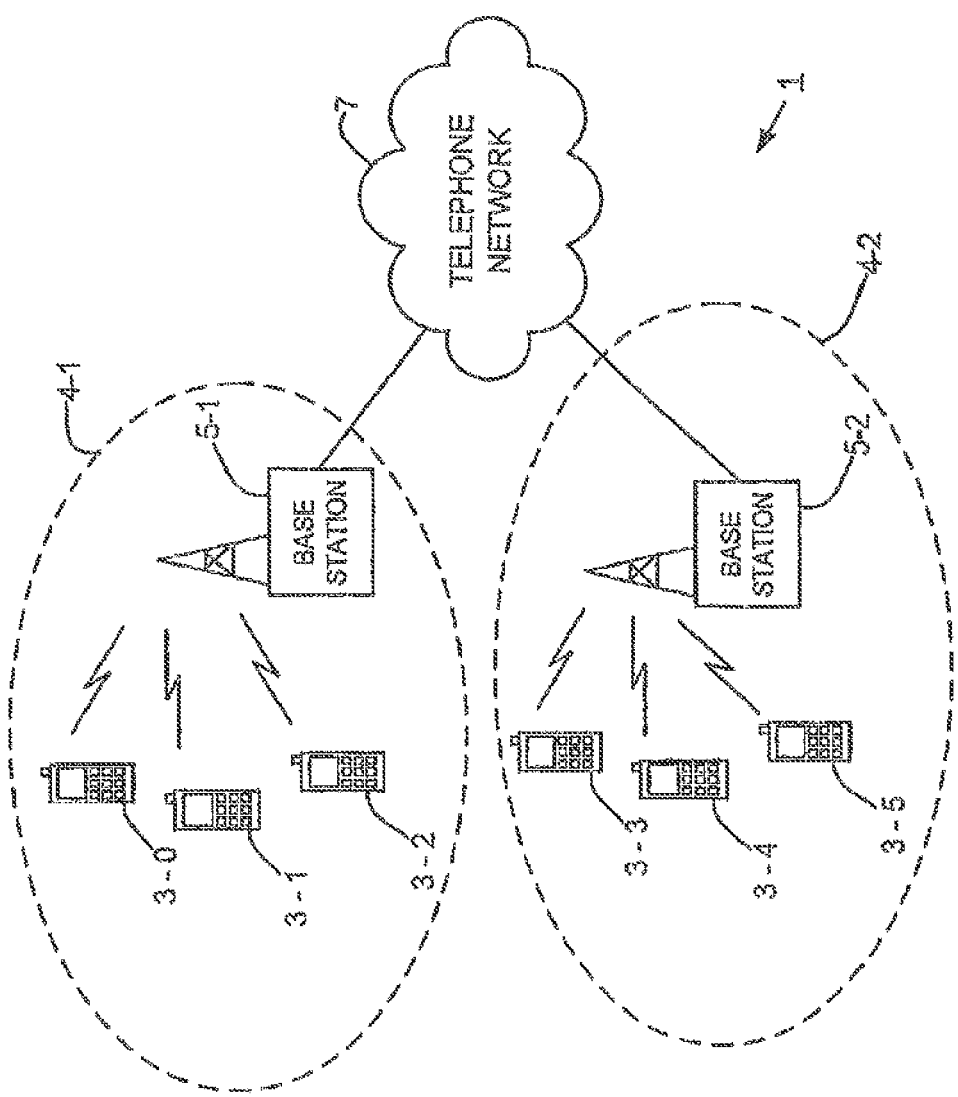
FIG. 1 schematically illustrates a communication system comprising a number of user mobile (cellular) telephones which communicate with one of two base stations connected to the telephone network.

FIG. 1 schematically illustrates a mobile (cellular) telecommunication system 1 in which users of mobile telephones 3-0, 3-1, and 3-2 in a first cell 4-1 can communicate with other users (not shown) via a first base station 5-1 and a telephone network 7 and in which users of mobile telephones 3-3, 3-4, and 3-5 in a second cell 4-2 can communicate with other users (not shown) via a second base station 5-2 and the telephone network 7. In this exemplary embodiment, the base stations 5 use an orthogonal frequency division multiple access (OFDMA) transmission technique for the downlink (from base stations 5 to the mobile telephones 3) and a L-DMA+FH transmission technique for the uplink (from the mobile telephones 3 to the base stations 5).

The use of frequency hopping for the uplink has been chosen because it provides service quality improvements through interference averaging and frequency diversity. In this exemplary embodiment, the frequency hopping scheme is chosen so that the following requirements are preferably met:

No collision between hopping mobile telephones 3 in the same cell 4;
Different hopping patterns in neighbouring cells 4 to reduce inter-cell interference;
High degree of frequency diversity for one mobile telephone 3 throughout the hopping pattern for subsequent transmissions;
Preserve the single carrier property of L-FDMA (in which the allocated frequency resources are provided as a single contiguous block of frequency resources);
Minimise the signalling overhead for informing the mobile telephones 3 of the hopping sequence; and
Frequency hopping designed for use by persistently scheduled mobile telephones 3 that are using, for example, services such as VoIP, as well as mobile telephones 3 that are dynamically scheduled on a TTI by TTI basis.

Time/Frequency Resources

Figure 2:
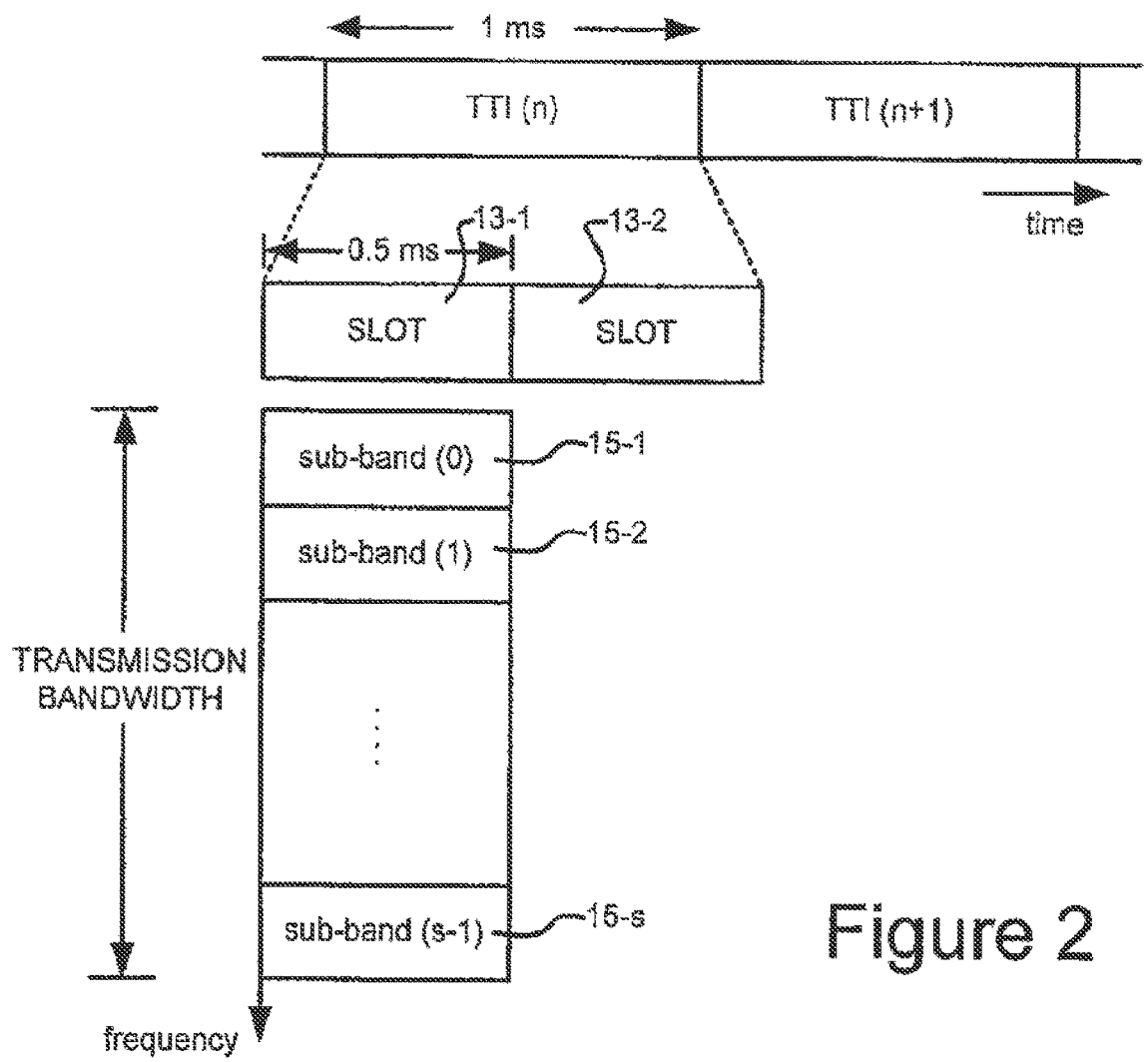
FIG. 2 illustrates the structure of a sub-frame of the E-UTRA communication system.

In this exemplary embodiment, the available transmission band is divided into a number of sub-bands, each of which comprises a number of contiguous sub-carriers arranged in contiguous blocks. Different mobile telephones 3 are allocated different resources block(s) (sub-carriers) within a sub-band at different times for transmitting their data. FIG. 2 illustrates E-UTRA's latest definition of the transmission channel as comprising a sequence of 1 ms Transmission Time Intervals (TTIs) 11-1, 11-2, each of which consists of two 0.5 ms slots 13-1 and 13-2. As shown, the available transmission bandwidth is divided into S sub-bands 15-1 to 15-s and each mobile telephone 3 is scheduled to transmit its uplink data in selected slots 13 and in selected sub-bands 15, in accordance with the agreed frequency hopping sequence.

Two different types of frequency hopping can be applied—Inter TTI frequency hopping and Intra TTI frequency hopping. Inter TTI frequency hopping is when the allocated frequency resource is changed from one TTI 11 to the next and intra TTI frequency hopping is where the allocated frequency resource is changed from one slot 13 to the next. The technique to be described below is applicable to both Inter and Intra TTI frequency hopping, although the description will refer mainly to Inter TTI frequency hopping.

Proposed Frequency Hopping Scheme

The frequency hopping scheme used in this exemplary embodiment relies on each mobile telephone 3 being given an initial allocation of resource blocks (one or more contiguous blocks of sub-carriers) within one of the sub-bands. These initial allocations are assigned by the base station 5, and so it can make sure that there are no collisions between the initial allocations for the mobile telephones 3 within its cell 4. These initial allocations are then changed in accordance with a hopping sequence allocated to the cell 4. The change applied at any point in time is an integer multiple of the number of resources in each sub-band. As a result, the frequency hopped resources that are allocated to a mobile telephone 3 will also be a contiguous block of resources in a single sub-band. This is beneficial as it allows the power amplifier (not shown) used by the mobile telephones 3 to be more efficient than would be the case if the resources used are not contiguous and are not in the same sub-band. It follows that, to maintain this advantage, the largest allowable contiguous allocation for a hopping mobile telephone 3 corresponds to the number of resource blocks in a sub-band.

Mathematically, the frequency hopping scheme used in this exemplary embodiment can be defined as follows:

$$y = \{x + a(t)N\} \mod NRB \qquad \text{Equation 1,}$$

where
NRB is the total number of resource blocks in the transmission band;
N is the number of contiguous resource blocks in each sub-band;
x is the initial resource block allocated to the mobile telephone;
y is the frequency hopped resource block;
t is a TTI (or slot) counter synchronised between the base station 5 and the mobile telephone 3;
a(t) is the current frequency hopping shift and is an integer value from the set $\{0, 1, \ldots, S-1\}$; and
S is the number of sub-bands.

Figure 3:
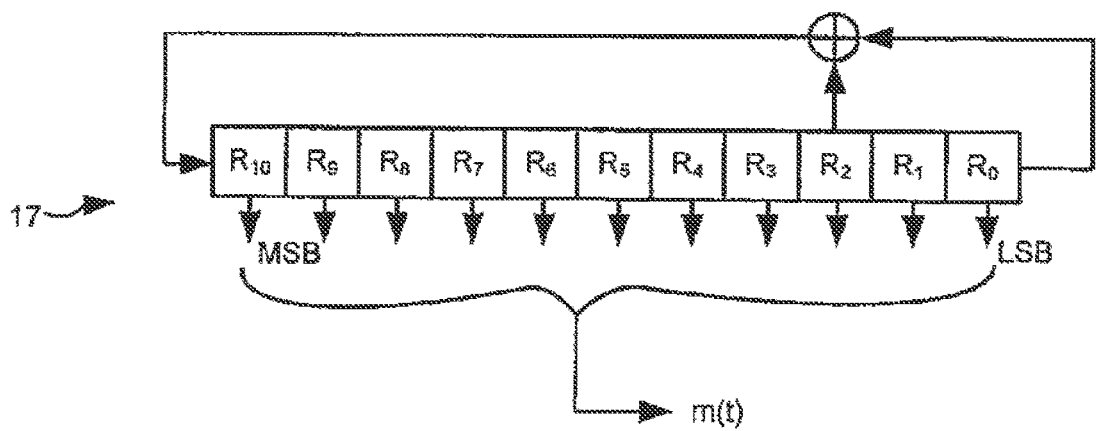
FIG. 3 is a block diagram illustrating a shift register used for generating a pseudo random binary sequence for controlling the frequency hopping to be used by each user mobile telephone.

FIG. 3 illustrates a shift register used for generating a pseudo random binary sequence for controlling the frequency hopping to be used by each user mobile telephone. The shift register of FIG. 3 will later be described.

Figure 4:
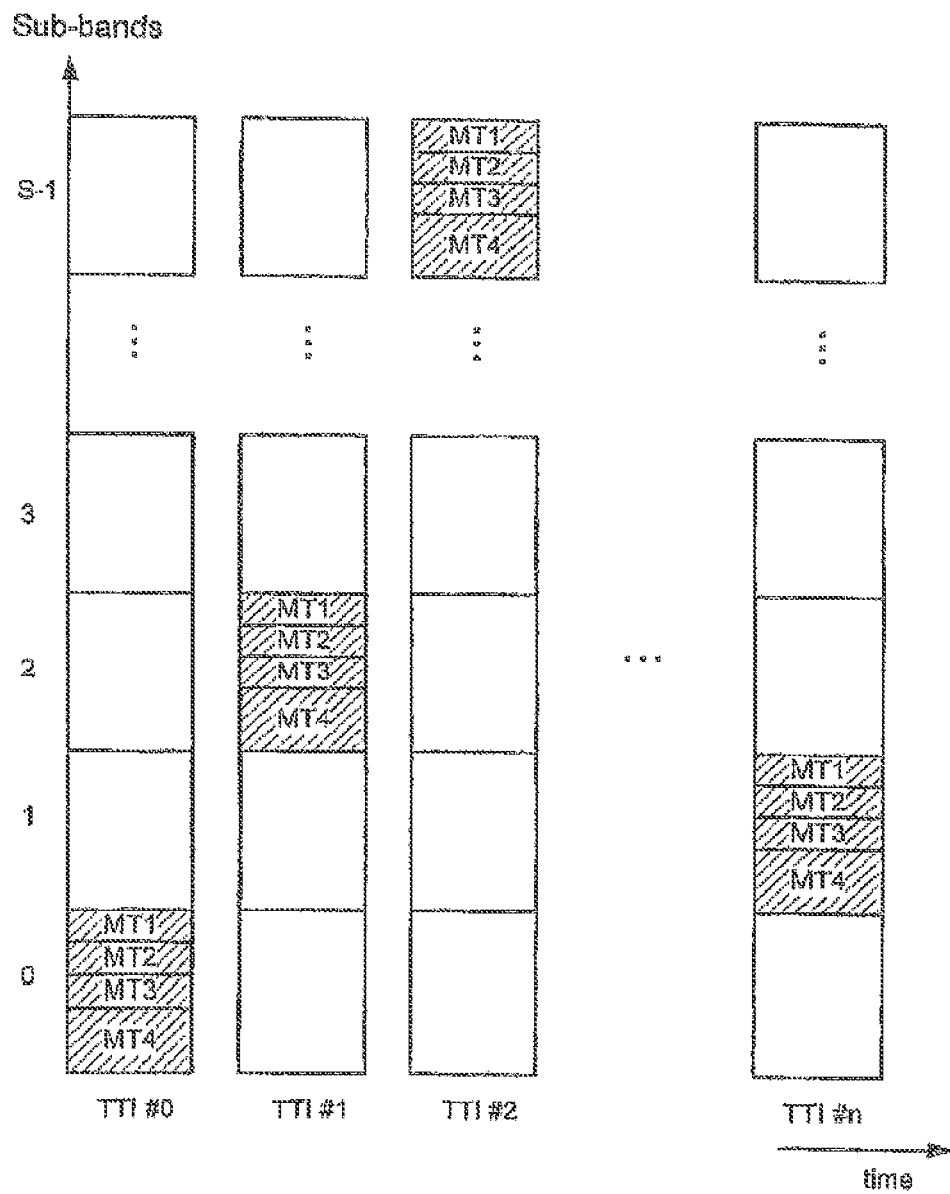
FIG. 4 is a time and frequency plot illustrating the way in which some of the available time and frequency resource blocks have been assigned to four mobile telephones.

FIG. 4 illustrates a hopping pattern that can be generated in the above manner for four mobile telephones (MTs), where MT1 to MT3 are assigned one resource block each while MT4 is assigned two resource blocks. In this example, a(t) has values of 0, 2, S−1 and 1 for TTI #0, TTI #1, TTI #2 and TTI #n respectively.

The way in which contiguous resource blocks can be allocated for the uplink and signalled to User Equipment (such as the mobile telephones 3) has already been proposed in TSG-RAN R1-070364, "Uplink Resource Allocation for EUTRA" NEC Group, NTT DoCoMo, the contents of which are incorporated herein by reference. As those skilled in the art will appreciate, if a mobile telephone 3 is assigned more than one resource block (x), then the calculation above is performed for each assigned resource block.

In this exemplary embodiment, NRB, N and S are system semi-static constants and are programmed into the mobile telephones 3 and the base stations 5 in advance. At any given time, the allocated resource block, x, is different for each of the mobile telephones 3 in the same cell 4. However, the value of a(t) at any point in time is common for all mobile telephones 3 in the same cell 4 and the value is changed in accordance with a predetermined hopping sequence. The hopping sequence preferably has the following properties:

1. It should be different in different cells 4 in order to randomise inter-cell interference;
2. It should be simple to generate (to minimise computational load in the base stations 5 and the mobile telephones 3);
3. It should be defined by a small number of parameters (to minimise signalling load); and
4. It should be periodic with a period, T, that is much longer than the transmission interval of persistently scheduled users (otherwise there is a risk that the transmission interval is equal to the period of a(t), in which case there would be no frequency diversity).

In the event that some TTIs are set aside for hopping mobile telephones 3, the hopping shift a(t) would only be applied in those TTIs. Dynamically scheduled mobile telephones 3 may still be scheduled in such 'hopping TTIs' in any resource blocks which are not occupied by the hopping mobile telephones 3.

There are a number of different ways of generating a(t) in the mobile telephones 3 and the base station 5. One possibility is use a pseudo-random sequence, resetting the sequence every T TTIs (or slots). A large number of sequences could easily be generated in this way and the sequence number could be signalled efficiently. For example, consider the shift register arrangement 17 shown in FIG. 3, which produces a length 2047 pseudo-random binary sequence (PRBS). The state of the shift register 17 is updated each TTI (or slot). If the 11 bit shift register value at time t is represented by m(t), then a pseudo-random value in the range 0 to S−1 can be calculated, for example, as follows:

$$a(t)=\text{floor}[(m(t) \cdot S)/20481] \quad \text{Equation 2,}$$

where floor[r] is the floor function, ie the largest integer not greater than r.

This calculation is easy to perform using a multiplication and bit shift. By resetting the shift register every T=256 TTIs (or slots), eight different sequences can be produced using different initial states. More specifically, the shift register 17 shown in FIG. 3 cycles through 2047 states that we can label s(0) to s(2046). As the registers are being reset every 256 TTIs (or slots), the register will only cycle through 256 of its 2047 possible states. Therefore, it is possible to use the same shift register 17 to generate different a(t) sequences, simply by starting the shift register 17 at different initial states. For example, a first a(t) sequence can be defined by setting the shift register 17 into initial state s(0); a second a(t) sequence can be defined by setting the shift registers 17 into initial state s(256); a third a(t) sequence can be defined by setting the shift registers 17 into initial state s(512) etc. Different sequences can then be assigned to the base station 5 and the mobile telephones 3 in the different cells 4, thereby avoiding the possibility that two mobile telephones 3 in different cells 4 could be following exactly the same frequency hopping pattern and therefore colliding 100% of the time. The mobile telephones 3 in a given cell 4 may be signalled with the initial state, but this would require eleven bits of signalling overhead. Therefore, in this exemplary embodiment, all the initial states are pre-programmed into the mobile telephones 3 and the appropriate one to be used by the mobile telephones 3 in a cell are signalled to the mobile telephones 3 using an associated sequence identifier (which would be a 3-bit identifier for the above example having eight different sequences).

Base Station

Figure 5:
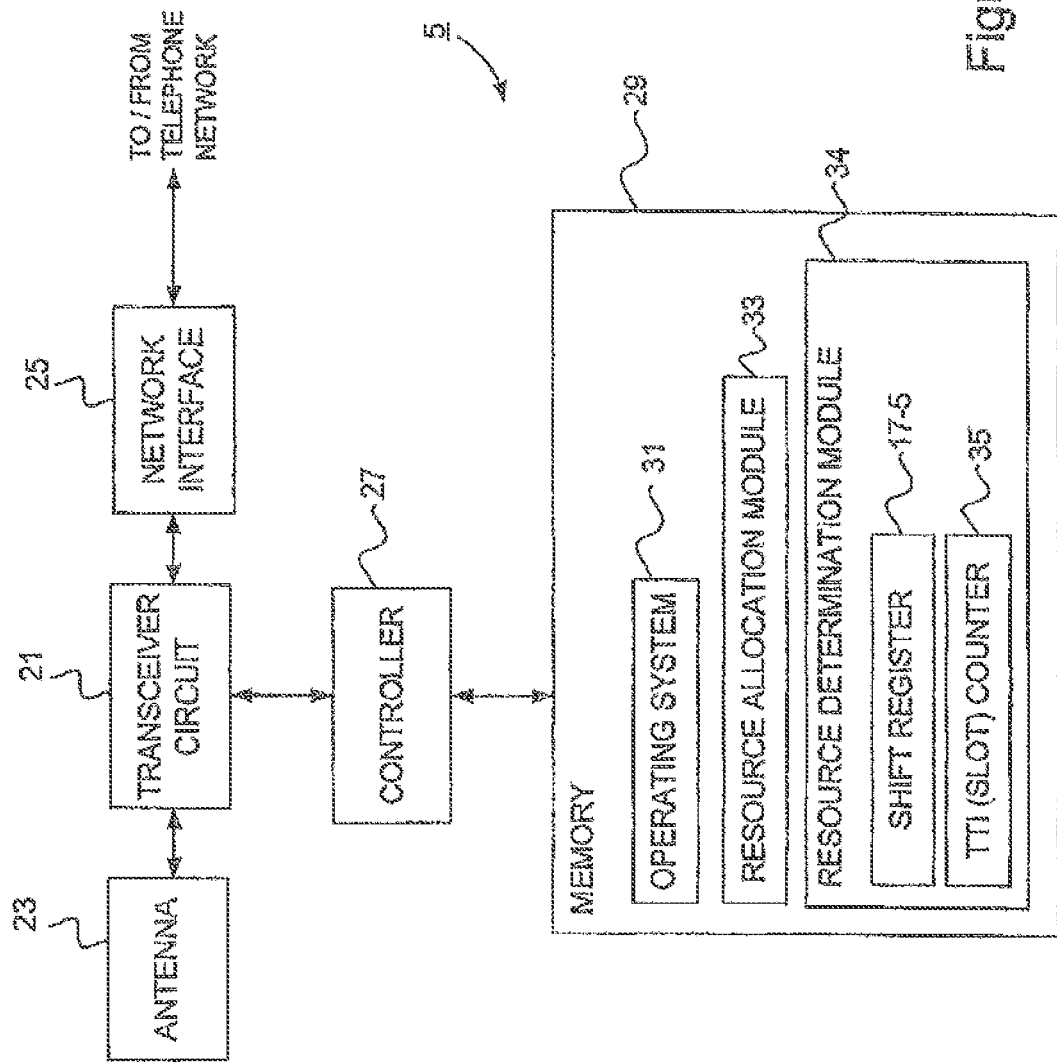
FIG. 5 is a block diagram illustrating the main components of one of the base stations shown in FIG. 1.

FIG. 5 is a block diagram illustrating the main components of each of the base stations 5 used in this exemplary embodiment. As shown, each base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. The operation of the transceiver circuit 21 is controlled by a controller 27 in accordance with software stored in memory 29. In this exemplary embodiment, the software in memory 29 includes, among other things, an operating system 31, a resource allocation module 33 and a resource determination module 34 (which modules may form part of the operating system 31).

The resource allocation module 33 is operable for allocating initial resource blocks (x) to be used by each of the mobile telephones 3 in their communications with the base station 5. This initial resource allocation depends on the type and quantity of data to be transmitted by the user device. For users subscribing to services where regular but small amounts of data are to be transmitted, the resource allocation module 33 allocates appropriate resource blocks on a recurring or periodic basis. For a VoIP service, for example, this may result in the user being allocated resource blocks every 20 ms. This type of allocation is referred to as persistent allocation. For users with larger volumes of data to be transmitted, the resource allocation module will allocate the appropriate resource blocks on dynamic basis, taking into account the current channel conditions between the user's mobile telephone 3 and the base station 5. This type of allocation is referred to as dynamic allocation.

The resource determination module 34 is provided for determining the actual frequency resources that each mobile telephone 3 will use to transmit its data to the base station 5. The resource determination module 34 uses the determined frequency resources to control the operation of the transceiver circuit 21 so that the data received from each mobile telephone 3 can be recovered and forwarded as appropriate to the telephone network 7. To achieve this, the resource determination module 34 implements the above described shift register 17-5 and TTI (or slot) counter (t) 35 (although these could be implemented as hardware in the controller 27), so that it can keep track of which resource block or blocks will actually be used by each mobile telephone 3 at each point in time, using equations 1 and 2 above and the initial allocations made by the resource allocation module 33. In this exemplary embodiment, the resource determination module 34 receives a sequence identifier from the telephone network 7 identifying the initial state to be applied to its shift register 17-5. The resource determination module 34 uses the sequence identifier to retrieve the corresponding initial state from memory which it then uses to set the initial state of the shift register 17-5. The resource determination module 34 also signals the received sequence identifier to all the mobile telephones 3 in its cell 4. The resource determination module 34 also transmits synchronisation data to synchronise the TTI (or slot) counters in the mobile telephones 3 with its own TTI (or slot) counter 35, so that the base station 5 and the mobile telephones 3 can maintain synchronisation in applying the frequency hopping sequence (a(t)).

Mobile Telephone

Figure 6:
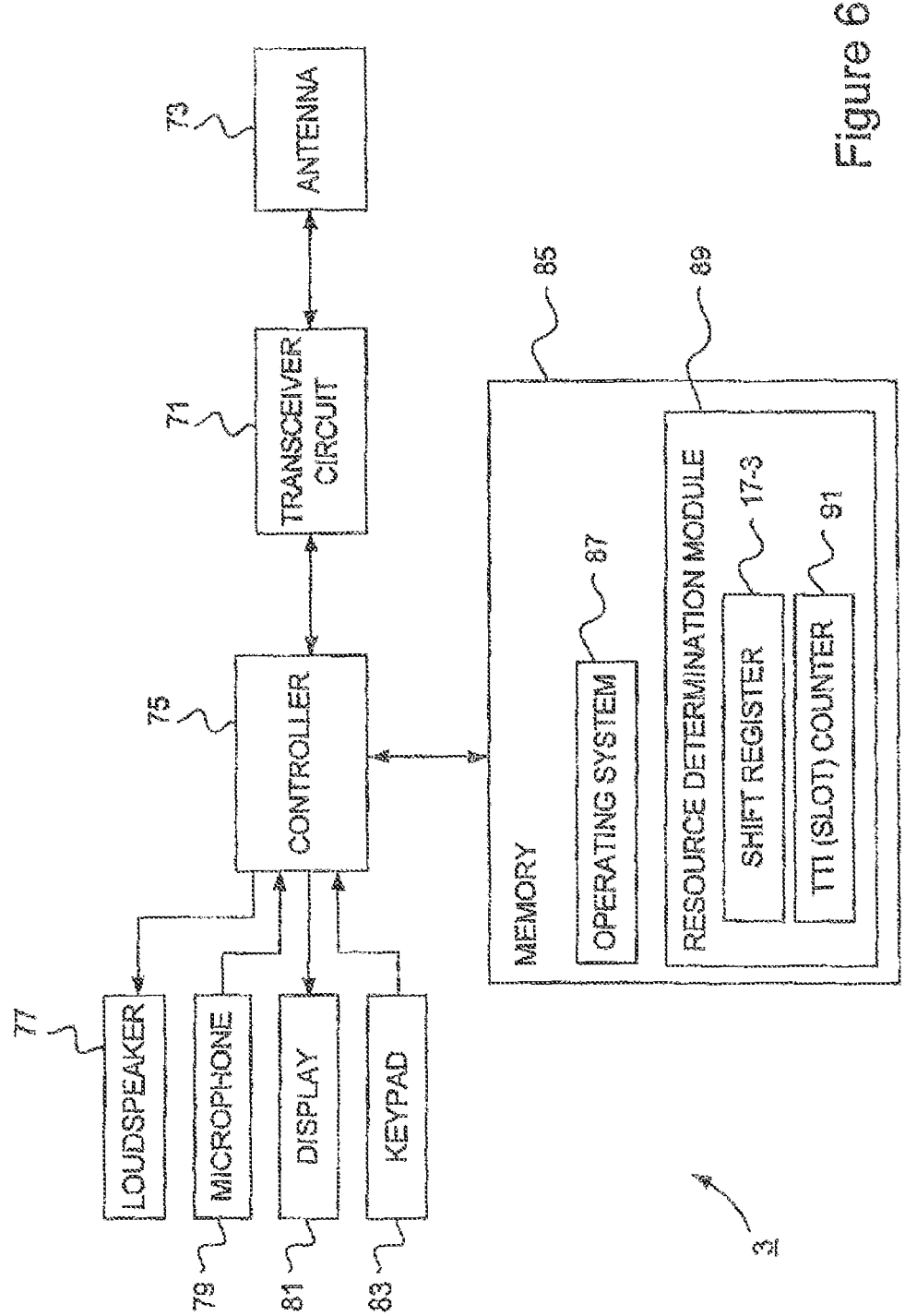
FIG. 6 is a block diagram illustrating the main components of one of the mobile telephones shown in FIG. 1.

FIG. 6 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a resource determination module 89. In this exemplary embodiment, the resource determination module 89 includes the above described 11-bit shift register 17-3 and a TTI (or slot) counter 91.

In operation, the resource determination module 89 receives the sequence identifier for the cell 4 transmitted by the base station 5 in a common signalling channel. The resource determination module 89 uses this sequence identifier to retrieve the corresponding initial state to be applied to the shift register 17-3 from memory. The resource determination module 89 also receives the synchronisation data for synchronising its TTI (or slot) counter 91 with the corresponding counter 35 in the base station 5. In this exemplary embodiment, the mobile telephone 3 receives this information at the time that it first associates with the base station 5. The resource determination module 89 also receives resource allocation data identifying the initially allocated resources, x, as well as the TTI 11 and/or the slot 13 in which those resources have been allocated to that mobile telephone 3.

For persistently scheduled mobile telephones 3, this resource allocation data may define a period between allocated TTIs or slots, such that the mobile telephone 3 is allocated resource block x every Y TTIs (or slots). In this case, the resource allocation data only has to be transmitted once or whenever the allocation is to be changed. For dynamically scheduled users, the resource allocation data must be transmitted before each scheduled transmission.

Once the resource determination module 89 has received the data to initialise the shift register 17-3 and the counter 91 as well as the resource allocation data, it uses equations 1 and 2 to determine the actual resource block(s) to use for its uplink transmissions in the scheduled TTI (or slot). This information is then used to control the operation of the transceiver circuit 71 accordingly.

MODIFICATIONS AND ALTERNATIVES

A detailed exemplary embodiment has been described above. As those skilled in the art will appreciate, a number of modifications and alternatives can be made to the above exemplary embodiment whilst still benefiting from the inventions embodied therein. By way of illustration only a number of these alternatives and modifications will now be described.

In the above exemplary embodiment, equation 2 was used to generate the value of a(t) to be used in equation 1. If required, this calculation could be modified slightly to ensure that successive values of a(t) are always different, as follows:

$$a(t)=\{a(t-1)+1+\text{floor}[(m(t)\cdot(S-1))/2M]\} \bmod S \quad \text{Equation 3,}$$

where $a(0)=0$ and M is the number of registers in the shift register 17.

Another possibility is to generate a(t) by cyclic sampling of the sequence 0, 1, S-1 as follows:

$$a(t)=kt \bmod S \ t=0 \text{ to } T-1,$$

where k is an integer co-prime to S. In this case, different values of k yield different sequences. However, since the resulting sequence will be periodic with period S, it is unlikely to meet the desired requirement that its period is much longer than the transmission interval of persistently scheduled users.

In the above exemplary embodiment, the base station 5 received the sequence identifier from the telephone network 7 which identified the initialisation state to be applied to its shift register 17-5. This allocation of the initialisation states may be fixed for the network or it may be changed on a regular or periodic basis. If it is changed, the base station 5 preferably broadcasts the new initialisation state (or state identifier) in a common signalling channel so that the mobile telephones 3 can update their shift registers 17-3 accordingly. In one exemplary embodiment, the base stations 5 may be arranged to randomly select an initialisation state to use. In this case it is possible that two neighbouring cells 4 could end up using the same hopping sequence, but by changing the sequence regularly or periodically it is possible to ensure that any resulting inter-cell interference will be short lived.

In the above exemplary embodiment, 11-bit shift registers were used in generating the appropriate frequency hopping sequence. As those skilled in the art will appreciate, longer or shorter length shift registers could be used instead.

Similarly, the number of different sequences that can be obtained from the shift register can also be varied—it does not have to be eight. As those skilled in the art will appreciate, for a given length of shift register, there is a tradeoff between the number of sequences that can be derived from it and the periodicity (T) of those sequences. The length of the sequence is preferably at least 5 times and more preferably more than 10 times longer than the transmission interval of any persistently scheduled users. To ensure maximum frequency diversity for all users, the length of the sequence should correspond to the length of the maximum transmission interval multiplied by the number of sub-bands (S).

In the above exemplary embodiment, a mobile telephone based telecommunication system was described in which the above described frequency hopping techniques were employed. As those skilled in the art will appreciate, many of these frequency hopping techniques can be employed in any communication system that uses a plurality of resource blocks. In particular, many of these frequency hopping techniques can be used in wire or wireless based communication systems which either use electromagnetic signals or acoustic signals to carry the data. In the general case, the base stations and the mobile telephones can be considered as communications nodes which communicate with each other. The frequency hopping techniques described above may be used just for uplink data, just for downlink data or for both downlink and uplink data. Other communications nodes may include user devices such as, for example, personal digital assistants, laptop computers, web browsers, etc.

In the above exemplary embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

In the above exemplary embodiments, certain system constants such as the total number of resource blocks in the communication channel, the number of sub-bands and the number of resource blocks in each sub-band were programmed into the mobile telephones and the base stations. This information may be programmed directly into the software instructions run on these devices or may be software inputs that can be varied from time to time. In either case, the mobile telephones and the base station will include data (software or inputs) that define these system constants either directly or indirectly. For example, data may be stored that directly defines the values of NRB and S together with data defining how N can be derived from these two.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way. The following description will use the nomenclature used in the Long Term Evolution (LTE) of UTRAN. For example, a base station is referred to as eNodeB and a user device is referred to as a UE.

1 INTRODUCTION

During TSG-RAN WG1 #46bis discussions, it was decided that Localised FDMA (L-FDMA) with inter and intra TTI frequency hopping (L-FDMA+FH) would be used for EUTRA Uplink However, there was not any discussion about what kind of frequency hopping pattern can be supported by EUTRA Uplink.

In this contribution, we collect some requirements that can be used for the selection of an efficient hopping pattern for L-FDMA uplink and propose a suitable frequency hopping scheme for the uplink.

2 REQUIREMENTS FOR FREQUENCY HOPPING PATTERN

It is well-known that frequency hopping provides service quality improvement through interference averaging and frequency diversity. However, frequency hopping needs to be tailored for each system. The following requirements are applicable to the LTE system [5-6];
No collision between hopping UEs in the same cell;
Different hopping patterns in neighbouring cells to reduce inter-cell interference;
High degree of frequency diversity for one UE throughout hopping pattern for the subsequent transmissions;
Preserve the single carrier property of the L-FDMA;
Signalling overhead for informing UEs of a specific or common hopping sequence should be kept as small as possible;
Frequency hopping should be designed for small sized packets intended to persistent scheduled UEs (e.g. VoIP service) as well as high speed UEs.

3 FREQUENCY HOPPING SCHEME

Let NRB be the total number of Resource Blocks (RBs) in the whole bandwidth. Let the bandwidth be divided into S sub-bands of N=NRB/S contiguous RBs each.

If a UE is assigned a RB x, it is understood that the RB actually used for transmission in TTI (or slot) number t is $y=x+a(t)N \bmod \text{NRB}$, where t is a TTI (or slot) counter synchronised between the eNodeB and UE; and a(t) is a value from the set $\{0, 1, \ldots, S-1\}$.

If a UE is assigned more than one RB, then the calculation above is performed for each assigned RB. Provided that all the assigned RBs are contiguous and contained within one of the S sub-bands, the single carrier property is retained even after applying the frequency hopping shift a(f). It follows that the largest allowable contiguous allocation for a hopping UE is N RBs. The signalling of the assigned contiguous resource allocations have already been proposed in [7].
The periodic sequence a(t) is common for all UEs in the cell, and should have the following properties.

5. It should be different in different cells in order to randomise inter-cell interference.

6. It should be simple to generate (to minimise computational load in the eNodeB and UE).

7. It should be defined by a small number of parameters (to minimise signalling load).

8. Its period, T, should be much longer than the transmission interval of persistently scheduled users (otherwise there is a risk that the transmission interval is equal to the period of a(t), in which case there would be no frequency diversity).

Figure 7:
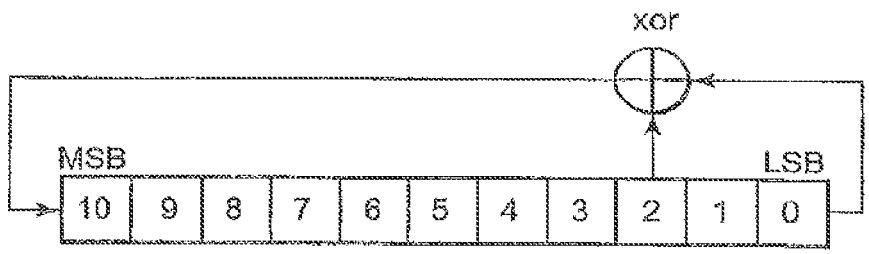
FIG. 7 is a block diagram illustrating a shift register arrangement like in FIG. 3.

In the case that some TTIs are set aside for hopping UEs, the hopping shift a(t) would only be applied in those TTIs. Dynamically scheduled UEs may still be scheduled in such 'hopping TTIs' in any RBs which are not occupied by hopping UEs.
One possibility is to generate a(t) using a pseudo-random sequence, resetting the sequence every T TTIs (or slots). A large number of sequences could easily be generated in this way and the sequence number could be signalled efficiently. For example, consider the shift register arrangement which is shown in FIG. 7 and which produces a length 2047 pseudo-random binary (PRBS) sequence.

The shift register state is updated each TTI (or slot). Let m(t) represent the 11-bit shift register value at time t. A pseudo-random value in the range 0 to S−1 can be obtained as follows:

$a(t)=\text{floor}[(m(t) \cdot S)/2048]$.

This calculation is easy to perform using a multiplication and bit shift. By resetting the shift register every T=256 TTIs (or slots), 8 different sequences can be produced using different initial states. Obviously a longer shift register could produce more sequences, and/or a larger period T. These different sequences can also be assigned into different cells.

If required, the calculation above could be modified slightly to ensure that successive values of a(t) are always different, as follows:

$a(t)=\{a(t-1)+1+\text{floor}[(m(t) \cdot (S-1))/2048]\} \bmod S$,
where $a(0)=0$.

Figure 8:
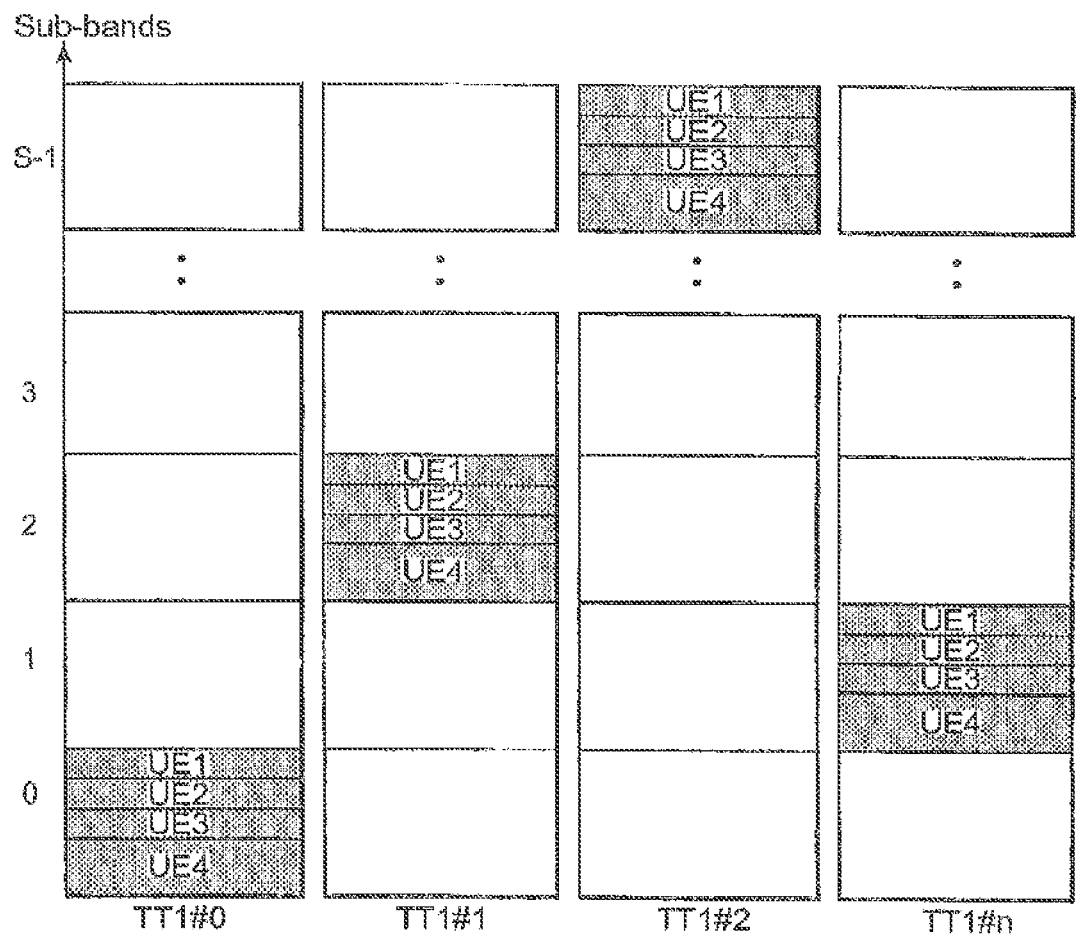
FIG. 8 is a time and frequency plot showing a hopping pattern for four UEs (user devices) in a cell like in FIG. 4.

FIG. 8 shows a hopping pattern for four UEs where UE1 to UE3 are assigned 1RB each while UE4 is assigned 2RBs. In this example, a(t) has values of 0, 2, S−1 and 1 for TTI #0, TTI #1, TTI #2 and TTI #n respectively.

4 CONCLUSIONS

This contribution outlines some requirements for the selection of an efficient hopping pattern for L-FDMA uplink In addition, a method for generating hopping patterns has been described for L-FDMA which avoids collision between hopping UEs and at the same time mitigates other cell interference.

Hence, we propose such frequency hopping scheme to be adopted for E-UTRA Uplink.

5 REFERENCES

[1] TSG-RAN WG1 #47, R1-063319 "Persistent Scheduling in E-UTRA", NTT DoCoMo, NEC Group.
[2] TSG-RAN WG1 LTE AdHoc, R1-060099, "Persistent Scheduling for E-UTRA" Ericsson.
[3] TSG-RAN WG1 #47, R1-063275, "Discussion on control signalling for persistent scheduling of VoIP", Samsung.
[4] TSG-RAN WG1 #44, R1-060604 "Performance Comparison of Distributed FDMA and Localised FDMA with Frequency Hopping for EUTRA Uplink", NEC Group.
[5] TSG-RAN WG1 #46Bis, R1-062761 "Performance of D-FDMA and L-FDMA with Frequency Hopping for EUTRA Uplink", NEC Group, NTT DoCoMo.
[6] TSG-RAN WG1 #46Bis, R1-062851 "Frequency hopping for E-UTRA uplink", Ericsson.
[7] R1-070364, "Uplink Resource Allocation for EUTRA" NEC Group, NTT DoCoMo.

While the invention has been particularly shown and described with reference to exemplary embodiments thereof, The invention is not limited to these embodiments. It will be understood by those of ordinary skill in the art that various changes in form and details may be made therein without departing from the spirit and scope of the present invention as defined by the claims.

The invention claimed is:

1. A method for a user device, the method comprising:
receiving information from a base station, the information corresponding to first continuous resource blocks allocated to the user device;
communicating with the base station using the first continuous resource blocks starting from a first resource block at a first slot in a subframe; and
communicating with the base station using second continuous resource blocks starting from a second resource block at a second slot in the subframe,
wherein the number of the first continuous resource blocks is the same as the number of the second continuous resource blocks,
wherein a position of the second resource block in a frequency axis is determined based on A mod B,
wherein A is determined by sum of a first value and a second value,
wherein B is determined by a third value, the third value indicating an uplink bandwidth size, and
wherein the first value indicates a position of the first resource block in the frequency axis and the second value is determined based on the uplink bandwidth size.

2. The method according to claim 1, wherein the number of the first continuous resource blocks is different from the number of third continuous resource blocks, which are allocated to another user device for use in the subframe.

3. The method according to claim 1, wherein the information corresponds to the position of the first resource block in the frequency axis and the number of the first continuous resource blocks.

4. An user device comprising:
a transceiver circuit configured to:
receive information from a base station, the information corresponding to first continuous resource blocks allocated to the user device; and
communicate with the base station using the first continuous resource blocks starting from a first resource block at a first slot in a subframe and using second continuous resource blocks starting from a second resource block at a second slot in the subframe; and
a controller configured to determine a position of the second resource block in a frequency axis based on A mod B,
wherein A is determined by sum of a first value and a second value,
wherein B is determined by a third value, the third value indicating an uplink bandwidth size, and
wherein the first value indicates a position of the first resource block in the frequency axis and the second value is determined based on the uplink bandwidth size.

5. The user device according to claim 4, wherein the number of the first continuous resource blocks is different from the number of third continuous resource blocks, which are allocated to another user device for use in the subframe.

6. The user device according to claim 4, wherein the information corresponds to the position of the first resource block in the frequency axis and the number of the first continuous resource blocks.

7. A method for a base station, the method comprising:
transmitting information to an user device, the information corresponding to first continuous resource blocks allocated to the user device;
communicating with the user device using the first continuous resource blocks starting from a first resource block at a first slot in a subframe; and
communicating with the user device using second continuous resource blocks starting from a second resource block at a second slot in the subframe;
wherein the number of the first continuous resource blocks is the same as the number of the second continuous resource blocks,
wherein a position of the second resource block in a frequency axis is determined based on A mod B,
wherein A is determined by sum of a first value and a second value,
wherein B is determined by a third value, the third value indicating an uplink bandwidth size, and
wherein the first value indicates a position of the first resource block in the frequency axis and the second value is determined based on the uplink bandwidth size.

8. The method according to claim 7, wherein the number of the first continuous resource blocks is different from the number of third continuous resource blocks, which are allocated to another user device for use in the subframe.

9. The method according to claim 7, wherein the information corresponds to the position of the first resource block in the frequency axis and the number of the first continuous resource blocks.

* * * * *